(12) United States Patent
Wang

(10) Patent No.: US 11,409,375 B2
(45) Date of Patent: Aug. 9, 2022

(54) METHOD AND APPARATUS FOR ADJUSTING OPTICAL SETTING OF OPTICAL INPUT DEVICE AND RELATED OPTICAL INPUT DEVICE

(71) Applicant: PixArt Imaging Inc., Hsin-Chu (TW)

(72) Inventor: Tsung-Fa Wang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 15/854,682

(22) Filed: Dec. 26, 2017

(65) Prior Publication Data

US 2018/0136741 A1    May 17, 2018

Related U.S. Application Data

(63) Continuation-in-part of application No. 15/613,262, filed on Jun. 4, 2017, now abandoned.

(30) Foreign Application Priority Data

Nov. 11, 2016   (TW) .................................. 105136754

(51) Int. Cl.
G06F 3/03      (2006.01)
G06F 3/0346    (2013.01)
G06F 3/0354    (2013.01)

(52) U.S. Cl.
CPC .......... G06F 3/0317 (2013.01); G06F 3/0346 (2013.01); G06F 3/0354 (2013.01)

(58) Field of Classification Search
None
See application file for complete search history.

(56) References Cited

U.S. PATENT DOCUMENTS

| 3,648,050 A | 3/1972 | Koo |
| 4,931,794 A | 6/1990 | Haag |
| 5,378,069 A | 1/1995 | Bowen |
| 5,567,902 A | 10/1996 | Kimble |
| 6,229,081 B1 | 5/2001 | Ura |
| 6,684,166 B2 | 1/2004 | Bellwood |
| 7,116,430 B2 | 10/2006 | Degertekin |
| 7,855,715 B1 | 12/2010 | Bowen |
| 8,013,233 B2 | 9/2011 | Komatsu |
| 9,343,248 B2 | 5/2016 | Casparian |
| 10,418,993 B2 | 9/2019 | Maigler |
| 2003/0208324 A1 | 11/2003 | Bellwood |
| 2003/0223132 A1 | 12/2003 | Seifert |
| 2005/0087061 A1 | 4/2005 | Sim |
| 2005/0190157 A1* | 9/2005 | Oliver .................. G06F 3/0304 345/166 |

(Continued)

FOREIGN PATENT DOCUMENTS

| CN | 1251457 A | 4/2000 |
| CN | 101414461 A | 4/2009 |

(Continued)

*Primary Examiner* — Benjamin X Casarez
(74) *Attorney, Agent, or Firm* — Winston Hsu

(57) ABSTRACT

A method of adjusting an optical setting of an optical input device includes: determining a desired level of an intensity of captured reflected light reflected from a tracking surface; determining whether a surface changing event occurs; and adjusting an optical setting of the optical input device according to the desired level of the intensity of the captured reflected light if it is determined the surface changing event occurs.

15 Claims, 4 Drawing Sheets

(56) References Cited

U.S. PATENT DOCUMENTS

| | | | | |
|---|---|---|---|---|
| 2005/0231482 | A1* | 10/2005 | Theytaz | G06F 3/0317 345/166 |
| 2006/0028442 | A1* | 2/2006 | Bynum | G06F 3/0317 345/157 |
| 2007/0109152 | A1 | 5/2007 | Wald | |
| 2007/0290991 | A1* | 12/2007 | Bieber | G06F 3/0317 345/157 |
| 2007/0291002 | A1* | 12/2007 | Yao | G06F 3/0317 345/166 |
| 2008/0061219 | A1* | 3/2008 | Lee | G06F 3/0317 250/221 |
| 2008/0122788 | A1* | 5/2008 | Sirtori | G06F 3/033 345/158 |
| 2009/0128488 | A1* | 5/2009 | Ang | G06F 3/0317 345/158 |
| 2009/0135140 | A1* | 5/2009 | Constantin | G06F 3/03543 345/166 |
| 2010/0060567 | A1* | 3/2010 | Larsen | G06F 3/0317 345/156 |
| 2011/0025604 | A1* | 2/2011 | Chang | G06F 3/03543 345/166 |
| 2011/0174959 | A1 | 7/2011 | Geloven | |
| 2011/0316782 | A1* | 12/2011 | Chuang | G06F 3/0317 345/166 |
| 2014/0111437 | A1* | 4/2014 | Chen | G06F 3/03543 345/166 |
| 2014/0218556 | A1 | 8/2014 | Chen | |
| 2015/0009146 | A1* | 1/2015 | Song | G06F 3/03543 345/166 |
| 2015/0160743 | A1* | 6/2015 | Song | G06F 3/0383 345/166 |
| 2016/0116592 | A1 | 4/2016 | Hiromi | |
| 2016/0306437 | A1 | 10/2016 | Zhang | |
| 2017/0139489 | A1 | 5/2017 | Chen | |
| 2017/0205879 | A1* | 7/2017 | Joseph | G06F 3/0383 |
| 2017/0205901 | A1 | 7/2017 | Chung | |
| 2018/0074694 | A1 | 3/2018 | Lehmann | |
| 2018/0081450 | A1 | 3/2018 | Yeh | |
| 2020/0081559 | A1* | 3/2020 | Unnikrishnan | G06F 3/0346 |

FOREIGN PATENT DOCUMENTS

| | | | |
|---|---|---|---|
| CN | 102479007 A | 5/2012 | |
| CN | 103197772 A | 7/2013 | |
| CN | 105183355 A | 12/2015 | |
| EP | 1 363 157 A2 | 11/2003 | |
| TW | 201432529 A | 8/2014 | |
| WO | WO-2010028191 A2 * | 3/2010 | G06F 3/0317 |

* cited by examiner

METHOD AND APPARATUS FOR ADJUSTING OPTICAL SETTING OF OPTICAL INPUT DEVICE AND RELATED OPTICAL INPUT DEVICE

CROSS REFERENCE TO RELATED APPLICATIONS

This application is a continuation-in-part of pending U.S. patent application Ser. No. 15/613,262 filed on Apr. 6, 2017, the disclosure of which is hereby incorporated by reference.

BACKGROUND OF THE INVENTION

1. Field of the Invention

The present invention relates generally to optical navigation, and more particularly to methods and apparatus that automatically adjusts optical setting of an optical input device when a tracking surface for the optical input device changes.

2. Description of the Prior Art

An optical input device, such as computer mouse, includes a light source that illuminates a tracking surface. An image sensor included in the optical input device acquires images of the tracking surface by capturing the light reflected from the tracking surface. By analyzing a series of images through a controller, the movement of the optical input device can be tracked.

Typically, such optical input device is used by a user in order to manipulate a location of a cursor on a screen. The cursor on the screen moves in response to the movement of the optical input device. In some designs, the user may be allowed to liftoff the optical input device from the tracking surface and reposition it without change the location of the cursor on the screen. In this regards, a liftoff detection is necessary and employed to prevent the movement of the optical input device from being tracked when the optical input device is lifted from the tracking surface beyond a certain height.

An approach to implement the liftoff detection is to measure the intensity of the captured reflected light. Once the intensity of the captured reflected light is lower than a liftoff threshold, it is determined a liftoff event occurs, which causes the optical input device to stop reporting displacement data to operating system of the computer. This is because the intensity of the reflected light should be in inverse proportion to a distance between the optical input device and the tracking surface. The higher the optical input device is lifted, the lower the intensity of the captured reflected light.

However, the intensity of the captured reflected light is also associated with texture of the tracking surface. Reflection coefficient of the tracking surface would affect the intensity of the reflected light. Hence, if the user lifts the optical input device from one tracking surface and reposition it onto another tracking surface, the intensity of the reflected light may change since the another tracking surface may have a different reflection coefficient.

When the tracking surface has a low reflection coefficient, the intensity of the captured reflected light would become low. As such, the liftoff detection may not work well because the intensity of captured reflected light may be constantly lower than the liftoff threshold. In other words, a predetermined liftoff threshold use in the liftoff detection may be not adaptable to any kinds of tracking surfaces.

In view of this, there is a need to provide a mechanism to remedy deficiencies of the liftoff detection when the optical input device is used on different tracking surfaces.

SUMMARY OF THE INVENTION

The present invention provides a mechanism to adjust the optical setting of the optical input device, thereby to guarantee the liftoff detection can properly work on different tracking surfaces. By a series of detection, the present invention can determine whether the optical input device is lifted and repositioned on a new tracking surface. If the optical input device is determined repositioned on the new tracking surface having a different reflection coefficient, the optical setting of the optical input device will be adjusted to make the liftoff detection can have same result. That is, the cursor would remain stationary at the same lift height even if the tracking surface changes.

According to one embodiment of the present invention, a method of adjusting an optical setting of an optical input device is provided. The method comprises: determining a desired level of an intensity of captured reflected light reflected from a tracking surface; determining whether a surface changing event occurs; and adjusting an optical setting of the optical input device according to the desired level of the intensity of the captured reflected light if it is determined the surface changing event occurs.

According to one embodiment of the present invention, an apparatus of adjusting an optical setting of an optical input device is provided. The apparatus comprises: a level determination unit, an event determination unit and an adjustment unit. The level determination unit is arranged to determine a desired level of an intensity of captured reflected light that is reflected from a tracking surface. The event determination unit is arranged to determine whether a surface changing event occurs. The adjustment unit is coupled to the event determination unit and the level determination unit, and arranged to adjust an optical setting regarding at least one of the light source and the image sensor according to the desired level of the intensity of the captured reflected light if the event determination unit determines the surface changing event occurs.

According to one embodiment of the present invention, an optical input device comprises: a light source; an image sensor; and a controller. The light source is arranged to direct light onto a tracking surface. The image sensor is arranged to capture reflected light reflected from the tracking surface by capturing images of the tracking surface. The controller is coupled to the image sensor and arranged to determine a desired level of the intensity of the captured reflected light, determine whether a surface changing event occurs; and adjust an optical setting regarding at least one of the light source and the image sensor according to the desired level of the intensity of the captured reflected light if the controller determined the surface changing event occurs.

These and other objectives of the present invention will no doubt become obvious to those of ordinary skill in the art after reading the following detailed description of the preferred embodiment that is illustrated in the various figures and drawings.

DETAILED DESCRIPTION

Reference throughout this specification to "one embodiment", "an embodiment", "one example" or "an example" means that a particular feature, structure or characteristic described in connection with the embodiment or example is included in at least one embodiment of the present embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present embodiments may be implemented as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, the present embodiments may take the form of a computer program product embodied in any tangible medium of expression having computer-usable program code embodied in the medium.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

Figure 1:
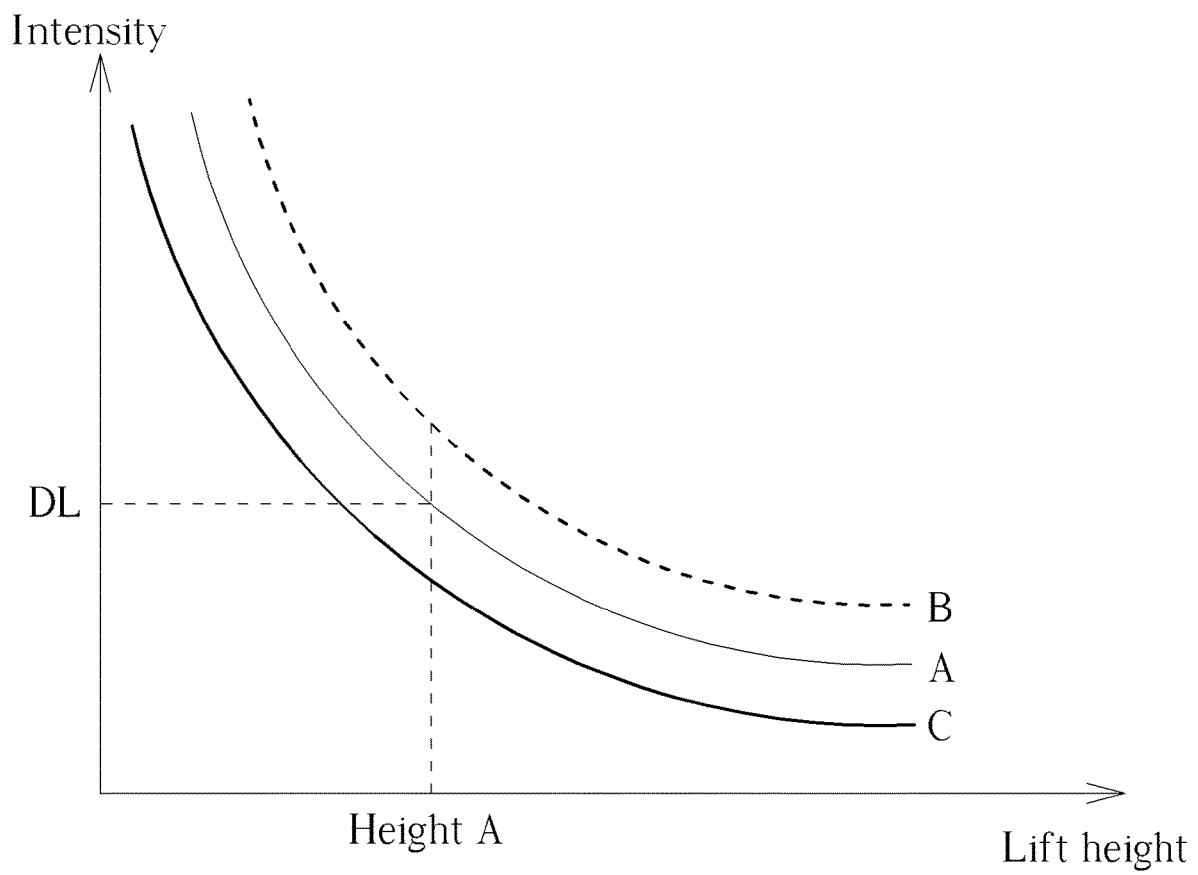
FIG. 1 illustrates a concept of the present invention.

FIG. 1 illustrates a concept of adjusting optical setting of the optical input device according to one embodiment of the present invention. As shown by drawing, the curve A indicates intensity of reflected light relative to lift height when the optical input device is manipulated on a standard tracking surface, while curves B and C respectively indicate intensities of reflected light relative to lift height when the optical input device is manipulated on different tracking surfaces. Disclosed embodiments of the present invention intends to adjust the optical setting to have the image sensor of the optical input device obtain similar intensities (e.g., level DL) of the reflected light at same lift height (e.g., height A) no matter what tracking surface the optical input device is positioned. Therefore, issues of liftoff detection caused by differences between reflection coefficients of different tracking surfaces can be addressed.

Figure 2:
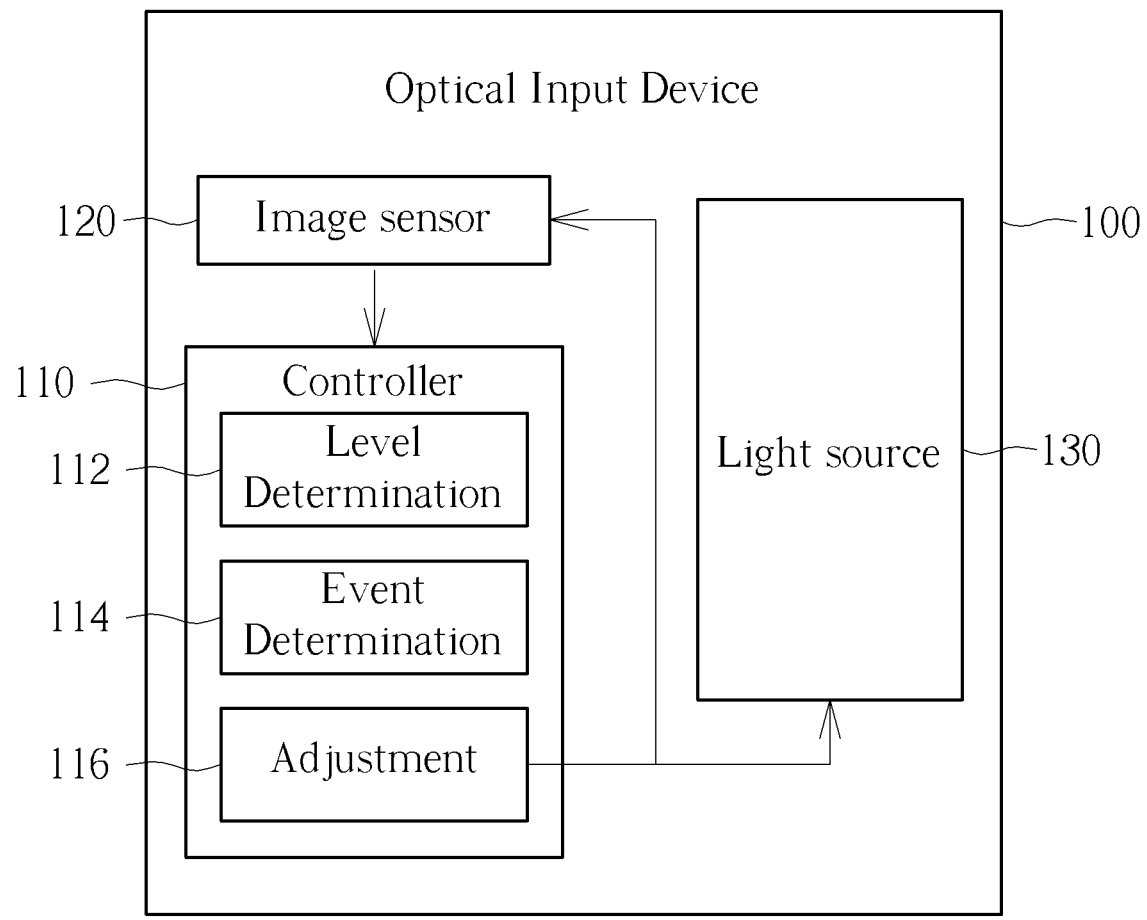
FIG. 2 illustrates an optical input device according to one embodiment of the present invention.

FIG. 2 illustrates a block diagram of an optical input device according to one embodiment of the present invention. As illustrated, an optical input device 100 (which may be a computer mouse coupled to a computer with a screen) includes a controller 110, an image sensor 120, a light source 130 (which may be an LED device). The light source 130 is arranged to direct light onto a tracking surface. The image sensor 120 is arranged to acquire images of the tracking surface by capturing the light reflecting from the tracking surface. By analyzing a series of images provide by the image sensor 120, the controller 110 could determine and track the movement of the optical input device 100, and therefore report displacement data to the computer. Accordingly, a cursor moves on the screen of the computer in response to displacement data reported by the controller 110.

Furthermore, a liftoff detection and control mechanism may be also incorporated into the controller 110. The controller 110 conducts the liftoff detection to determine whether the optical input device 100 is lifted off the tracking surface beyond a certain height. The controller 110 can obtain the intensity of the captured reflected light according to an averaged brightness of images captured by an image sensor 120. By comparing the intensity of captured reflected light with a liftoff threshold, a liftoff event can be determined. Once the controller 110 determines a liftoff event occurs, the liftoff control mechanism of the controller 110 will determine to stop reporting displacement data to the computer such that the cursor on the screen of the computer could remain stationary.

Figure 3:
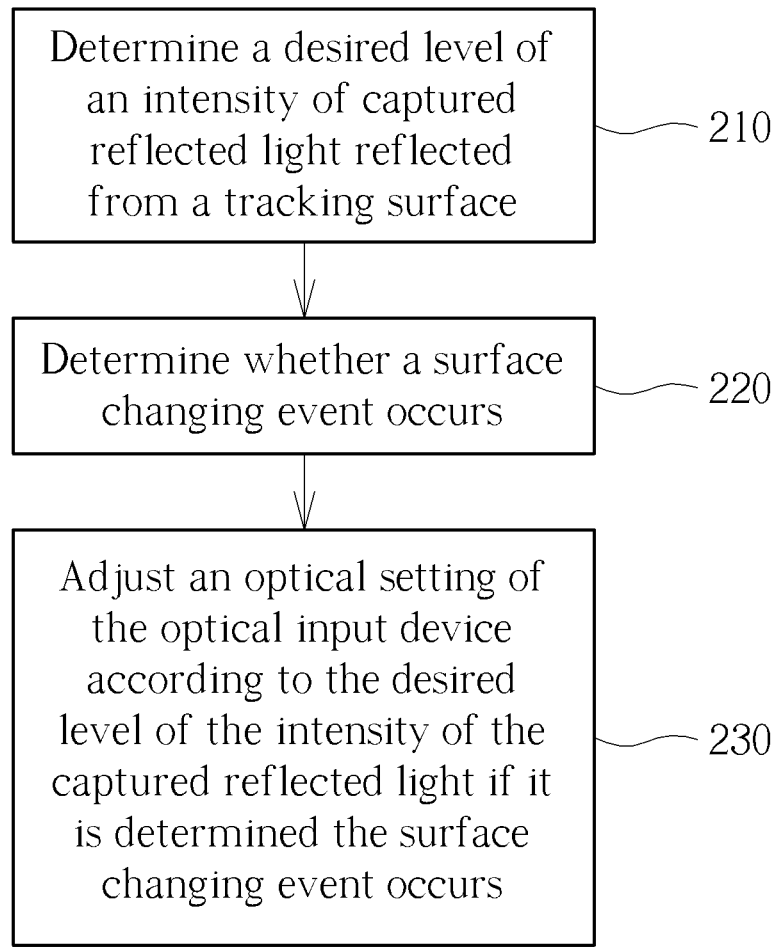
FIG. 3 illustrates a flow chart of a method of adjusting optical setting of an optical input device according to one embodiment of the present invention.

A flow chart of a method of adjusting optical setting of an optical input device according to one embodiment of the present invention is illustrated in FIG. 3. Please refer to FIG. 3 in conjunction with FIG. 2 for better understandings. At step 210, it is determined a desired level of the intensity of the captured reflected light. At step 210, the level determination unit 112 would determine a desired level of the intensity of the captured reflected light with or without user involvement. After the desired level of the intensity of the captured is determined, the controller 110 would adjust the optical setting to have intensities of the captured reflected light that are measured over different tracking surfaces substantially identical to the desired level. In the preferred embodiment, the desired level would be the intensity of the captured reflected light measured when the optical input device is contacted with the tracking surface.

At step 220, it is determined whether a "surface changing" event occurs. The "surface changing" event indicates the optical input device 100 is lifted from one tracking surface and repositioned onto another tracking surface. An event determination unit 114 of the controller 110 may perform a series of detections according to images provided by the image sensor 120 to detect the surface changing event, which will be detailed later.

At step 230, once the event determination unit 114 determines the surface changing event occurs, an adjustment unit 116 of the controller 110 will adjust the optical setting of the optical input device 100. In this regards, the optical setting will be tuned until the desired level of the intensity of the captured reflected light is reached. According to various embodiments of the present invention, the optical setting comprises: sensitivity of the image sensor 120, a driving power of a light source 130, a pulse duration of the light source 130. When the surface changing event is detected, at least one of the above-mentioned optical settings will be adjusted individually or collectively, thereby to have the captured reflected light maintain at desired level.

Figure 4:
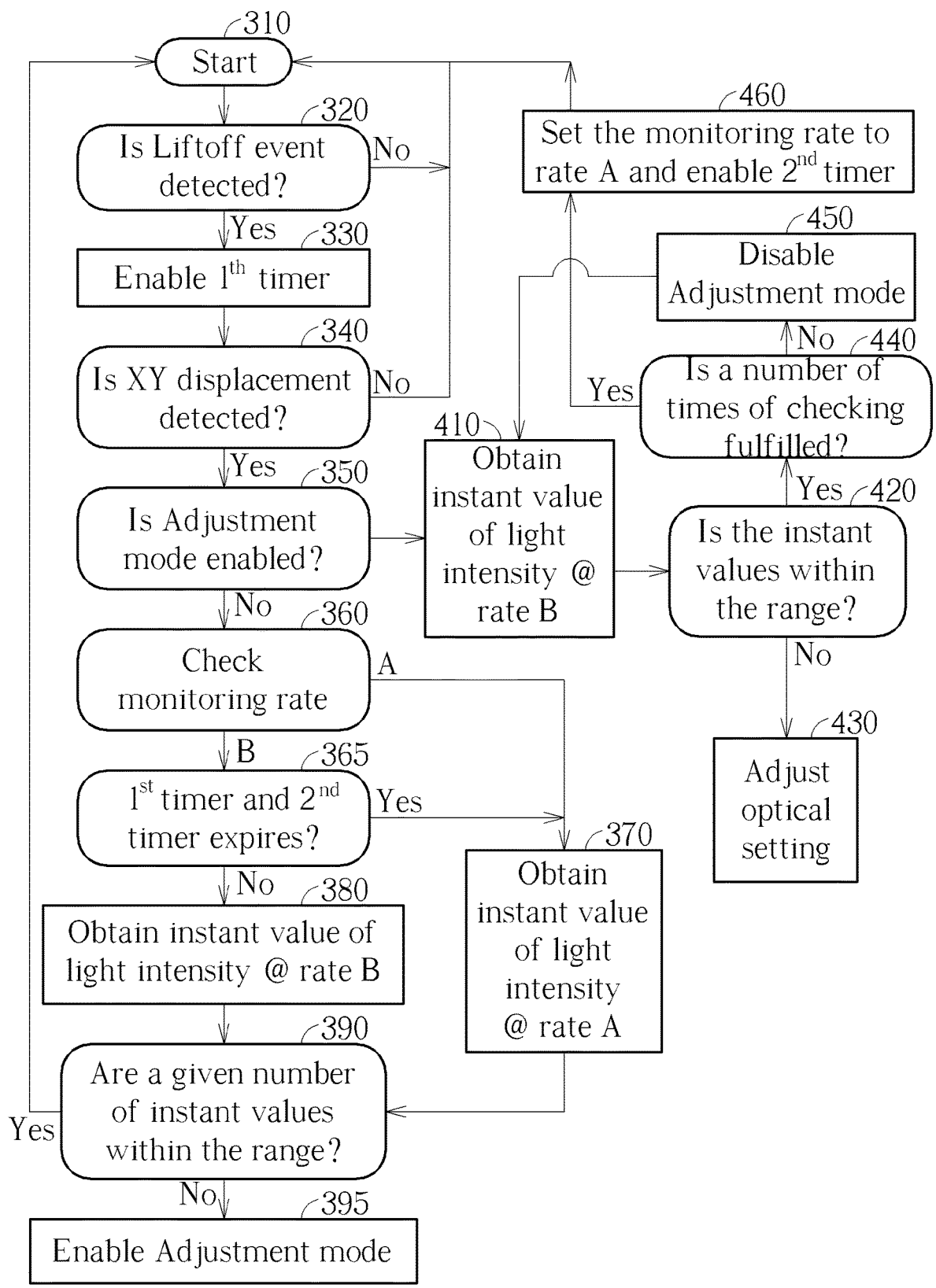
FIG. 4 illustrates a detailed flow chart regarding how to determine a surface changing event occurs according to one embodiment of the present invention.

FIG. 4 illustrates a detailed flow chart regarding how (the event determination unit 114) to detect the surface changing event and accordingly make the adjustment unit 116 adjust the optical setting. At step 310, the flow starts. At step 320, it is determined whether a liftoff event occurs. The liftoff event represents the optical input device 100 is lifted from the tracking surface beyond a certain height, which can be achieved by comparing an instant value of the intensity of the captured reflected light with a liftoff threshold corresponding to the certain height. If the intensity of the captured reflected light is lower than the liftoff threshold, the event determination unit 114 determines the liftoff event occurs. Further, the liftoff event may also cause the controller 110 to stop reporting displacement data to the computer.

If the liftoff event is determined occurs, the flow goes to step 330, a first timer is enabled to count a first period of time, such as 200 ms. Then, the flow goes to step 340, which determines whether the optical input device 110 has XY displacement relative to the tracking surface. The controller 110 could determine the XY displacement according to images provided by the image sensor 120. When both of the liftoff event and XY displacement are determined occurs, the optical input device 100 may be physically lifted from the original tracking surface and has a horizontal displacement, which implies the optical input device 100 is likely to be moved onto a new tracking surface.

Hence, the flow goes to step 350, which determines whether an adjustment mode is enabled. If yes, the flow goes to step 410; otherwise, the flow goes to step 360. Initially, the adjustment mode will be set as disabled. At step 360, a monitoring rate setting will be checked. If the monitoring rate is set as a relatively slow rate A, such as 30 ms, the flow goes to step 370. If the monitoring rate is set as a relatively fast rate B, such as 2 ms, the flow goes to step 365. At step 365, it is determined whether the first period of time counted by the first timer expires and a second period of time counted by a second timer expires. If yes, the flow goes back to step 370; otherwise, the flow goes to step 380.

At step 370, the event determination unit 114 continually obtains an instant value of the intensity of the captured reflected light at rate A. For example, the event determination unit 114 may obtain an instant value of the intensity of the captured reflected light every 30 ms. At step 380, the event determination unit 114 continually obtains an instant value of the intensity of the captured reflected light at rate B. For example, the event determination unit 114 may obtain the instant value of the intensity of the captured reflected light every 2 ms.

At step 390, it is determined whether a given number of instant values of the intensity of the captured reflected light not fall within a range around the desired level. For example, the event determination unit 114 may obtain the intensity of the captured reflected light every 30 ms. If 10 consecutive instant values of the intensity of the captured reflected light do not fall within the range from 122 to 128 (supposing that the desired level is 125), the flow goes to step 395, which enables the adjustment mode. Alternatively, the event determination unit 114 may obtain the instant value of the intensity of the captured reflected light every 2 ms. If 10 consecutive instant values of the intensity of the captured reflected light do not fall within the range from 122 to 128, the flow also goes to step 395, which enables the adjustment mode. On the other hand, if the given number of the instant values of in of the captured reflected light do fall within the range from 122 to 128, the flow will return back step 310.

When the adjustment mode is enabled, the flow goes to step 410, wherein the event determination unit 114 obtains the instant value of the intensity of the captured reflected light at the relatively fast rate B. At step 420, it is determined whether the instant value of the intensity of the captured reflected light falls within the range around the desired level. If no, the flow goes to the step 430, wherein the surface changing event is determined occurs and the adjustment unit 116 will adjust at least one of sensitivity of the image sensor 120, driving power of the light source 130 and pulse duration of the light source 130, collectively or individually until another instant value of the intensity of the captured reflected light is reached or approached the desired level.

On the other hand, if it is determined the instant value of the intensity of the captured reflected light does fall within the range around the desired level, the flow goes to step 440. At step 440, it is checked whether a number of consecutive instant values of the intensity of the captured reflected light falls within the range around the desired level. If no, the flow goes to step 450, which disables the adjustment mode and accordingly returns back to the step 410 and 420, obtaining another instant value and recheck it again. If yes, the flow goes to step 460, which sets the monitoring rate as the relatively slow rate A and enables the second timer, and accordingly returns back to the step 310.

As mentioned above, the controller 110 may have the liftoff detection and control mechanism. During the flow of FIG. 4, the liftoff control mechanism may be disabled. After the intensity of the captured reflected light is confirmed to reach or approach the desired level, the liftoff control mechanism will be enabled again.

In summary, embodiments of the present invention determine whether the liftoff event and XY displacement of the optical input device occur. If both of them occur, embodiments of the present invention start to monitor changes of instant values of the intensity of the captured reflected light. When a number of consecutive sampled instant values does not reach or approach the desire level, it is confirmed the optical input mouse has been lifted and move onto a tracking surface having reflection coefficients that is different from previous one. Hence, the adjustment mechanism of the embodiments of the present invention would be enabled to tune the optical setting of the optical input mouse until the intensity of the captured reflected light reaches or approaches the desired level. By doing so, the predetermined liftoff threshold in the liftoff detection and control mechanism can be adaptable to different tracking surfaces. That is, the cursor would remain stationary at the same lift height even if the tracking surface changes. This significantly improves and guarantees user experience in manipulating the optical input device over different tracking surfaces. The user will not be confused or feel strange on cursor response while he/she intentionally or unintentionally changes the tracking surface.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of adjusting an optical setting of an optical input device in order to calibrate liftoff detection on different tracking surfaces, comprising:
   determining a desired level of an intensity of captured reflected light reflected from a first tracking surface;
   determining whether a surface changing event occurs, wherein the surface changing event represents the optical input device is lifted from the first tracking surface with a first reflection coefficient and then placed onto a second tracking surface with a second reflection coefficient that is different from the first reflection coefficient, comprising:
      determining whether the optical input device is lifted from the first tracking surface by a certain height according to instant values of intensity of reflected light detected by an image sensor;
      counting a first period of time if it is determined that the optical input device is lifted from the first tracking surface by the certain height;
      determining whether the optical input device has a horizontal displacement relative to the first tracking surface after the first period of time expires according to images provided by the image sensor; and
      determining whether the surface changing event occurs according to at least the horizontal displacement and whether the intensity of the captured reflected light changes during a second period of time;
   determining whether to start adjusting the optical setting of the optical input device if it is determined the surface changing event occurs, comprising:
      obtaining instant values of the intensity of the captured reflected light at a high monitoring rate if an adjustment mode is enabled;
      obtaining instant values of the intensity of the captured reflected light at a low monitoring rate if the adjustment mode is not enabled;
      determining to start adjusting the optical setting of the optical input device if the instant values of the intensity obtained at the high monitoring rate is not within a predetermined range,
      switching the high monitoring rate to the low monitoring rate if the instant values of the intensity obtained at the high monitoring rate is within the predetermined range;
      enabling the adjustment mode if the instant values of the intensity of the captured reflected light obtained at the low monitoring rate are not within the predetermined range;
   adjusting the optical setting of the optical input device according to the desired level of the intensity of the captured reflected light if it is determined to start adjusting the optical setting; and
   performing the liftoff detection on the second tracking surface according to at least one of adjusted sensitivity of the image sensor, adjusted driving power and adjusted pulse duration of a light source;
   wherein the liftoff detection is calibrated to detect a liftoff event at a same lift height over different tracking surfaces.

2. The method of claim 1, wherein the step of determining whether the surface changing event occurs further comprises:
   monitoring the intensity of the captured reflected light if it is determined that the optical input device is lifted from the first tracking surface by the certain height and the optical input device has a horizontal displacement relative to the first tracking surface.

3. The method of claim 2, wherein the step of monitoring the intensity of the captured reflected light comprises:
   obtaining an instant value of the intensity of the captured reflected light at a first rate; and
   determining the surface changing event occurs when a given number of instant values of the intensity of the captured reflected light is lower than the desired level by a first threshold or higher than the desired level by a second threshold.

4. The method of claim 2, wherein the step of monitoring the intensity of the captured reflected light comprises:
   obtaining an instant value of the intensity of the captured reflected light at a second rate in a given period of time; and
   determining the surface changing event occurs when a given number of instant values of the intensity of the captured reflected light is lower than the desired level by a first threshold or higher than the desired level by a second threshold.

5. The method of claim 1, wherein the step of adjusting the optical setting of the optical input device comprises:
   adjusting at least one of sensitivity of the image sensor of the optical input device, driving power of the light source of the optical input device and pulse duration of the light source; and
   adjusting the at least one of sensitivity of the image sensor of the optical input device, driving power of the light source of the optical input device and pulse duration of the light source until the intensity of the captured reflected light is not lower than the desired level by a first threshold and not higher than the desired level by a second threshold.

6. An apparatus for adjusting an optical setting of an optical input device having a light source and an image sensor in order to calibrate liftoff detection of the optical input device on different tracking surfaces, the apparatus comprising:
   a level determination unit, arranged to determine a desired level of an intensity of captured reflected light that is reflected from a first tracking surface;
   an event determination unit, arranged to determine whether a surface changing event occurs, wherein the surface changing event represents the optical input device is lifted from the first tracking surface with a first reflection coefficient and then placed onto a second tracking surface with a second reflection coefficient that is different from the first reflection coefficient; and the event determination unit is arranged to determine whether the optical input device is lifted from the first tracking surface by a certain height according to instant values of intensity of reflected light detected by the image sensor, count a first period of time if it is determined that the optical input device is lifted from the first tracking surface by the certain height, determine whether the optical input device has a horizontal displacement relative to the first tracking surface after the first period of time expires according to images provided by the image sensor; and determine whether the surface changing event occurs according to at least the horizontal displacement and whether the intensity of the captured reflected light changes during a second period of time; and an adjustment unit, coupled to the event determination unit and the level determination unit, arranged to:

obtain instant values of the intensity of the captured reflected light at a high monitoring rate if an adjustment mode is enabled;

obtain instant values of the intensity of the captured reflected light at a low monitoring rate if the adjustment mode is not enabled;

determine to start adjusting the optical setting of the optical input device if the instant values of the intensity obtained at the high monitoring rate is not within a predetermined range;

switch the high monitoring rate to the low monitoring rate if the instant values of the intensity obtained at the high monitoring rate is within the predetermined range;

enable the adjustment mode the if instant values of the intensity of the captured reflected light obtained at the low monitoring rate are not within the predetermined range;

wherein the adjustment unit is arranged to adjust the optical setting regarding at least one of the light source and the image sensor according to the desired level of the intensity of the captured reflected light if it is determined to start adjusting the optical setting; and wherein the apparatus is arranged to perform the liftoff detection on the second tracking surface according to at least one of adjusted sensitivity of the image sensor, adjusted driving power and adjusted pulse duration of the light source; wherein the liftoff detection is calibrated to detect a liftoff event at a same lift height over different tracking surfaces.

7. The apparatus of claim 6, wherein the event determination unit is further arranged to:

monitor the intensity of the captured reflected light if it is determined that the optical input device is lifted from the first tracking surface by the certain height and the optical input device has a horizontal displacement relative to the first tracking surface.

8. The apparatus of claim 7, wherein the event determination unit is arranged to:

obtain an instant value of the intensity of the captured reflected light at a first rate; and determine the surface changing event occurs when a given number of instant values of the intensity of the captured reflected light are lower than the desired level by a first threshold or higher than the desired level by a second threshold.

9. The apparatus of claim 7, wherein the event determination unit is arranged to:

obtain an instant value of the intensity of the captured reflected light at a second rate in a given period of time; and determine the surface changing event occurs when a given number of instant values of the intensity of the captured reflected light are lower than the desired level by a first threshold or higher than the desired level by a second threshold.

10. The apparatus of claim 6, wherein the adjustment unit is arranged to:

adjust at least one of sensitivity of the image sensor of, driving power of the light source and pulse duration of the light source; and adjust the at least one of sensitivity of the image sensor, driving power of the light source and pulse duration of the light source until the intensity of the captured reflected light is not lower than the desired level by a first threshold or not higher than the desired level by a second threshold.

11. An optical input device with liftoff detection calibration, comprising:

a light source, arranged to direct light onto a tracking surface;

an image sensor, arranged to acquire capture images of the tracking surface by capturing light reflected from the tracking surface; and a controller coupled to the image sensor and arranged to determine a desired level of the intensity of the captured reflected light from a first tracking surface, determine whether a surface changing event occurs; adjust an optical setting regarding at least one of the light source and the image sensor according to the desired level of the intensity of the captured reflected light if it is determined to start adjusting the optical setting; and perform liftoff detection on a second tracking surface according to at least one of adjusted sensitivity of the image sensor, adjusted driving power and adjusted pulse duration of the light source;

wherein the surface changing event represents the optical input device is lifted from the first tracking surface with a first reflection coefficient and then placed onto the second tracking surface with a second reflection coefficient that is different from the first reflection coefficient; and the controller determines whether the surface changing event occurs by determining whether the optical input device is lifted from the first tracking surface by a certain height according to instant values of intensity of reflected light detected by the image sensor, counting a first period of time if it is determined that the optical input device is lifted from the first tracking surface by the certain height, determining whether the optical input device has a horizontal displacement relative to the first tracking surface after the first period of time expires according to images provided by the image sensor; and determining whether the surface changing event occurs according to at least the horizontal displacement and whether the intensity of the captured reflected light changes during a second period of time; wherein the controller obtains instant values of the intensity of the captured reflected light at a high monitoring rate if an adjustment mode is enabled, obtains instant values of the intensity of the captured reflected light at a low monitoring rate if the adjustment mode is not enabled, determines to start adjusting the optical setting of the optical input device if the instant values of the intensity obtained at the high monitoring rate is not within a predetermined range, switches the high monitoring rate to the low monitoring rate if the instant values of the intensity obtained at the high monitoring rate is within the predetermined range, enables the adjustment mode if the instant values of the intensity of the captured reflected light obtained at the low monitoring rate are not within the predetermined range;

wherein the controller calibrates the liftoff detection to detect a liftoff event at a same lift height over different tracking surfaces.

12. The optical input device of claim 11, wherein the controller is arranged to:

monitor the intensity of the captured reflected light if the controller determined that the optical input device is lifted from the first tracking surface by the certain height and the optical input device has a horizontal displacement relative to the first tracking surface.

13. The optical input device of claim 12, wherein the controller is arranged to:

obtain an instant value of the intensity of the captured reflected light at a first rate; and determine the surface changing event occurs when a given number of instant values of the intensity of the captured reflected light are lower than the desired level by a first threshold or higher than the desired level by a second threshold.

14. The optical input device of claim 12, wherein the controller is arranged to:

obtain the intensity of the captured reflected light at a second rate in a given period of time; and determine the surface changing event occurs when a given number of instant values of the intensity of the captured reflected light are lower than the desired level by a first threshold or higher than the desired level by a second threshold.

15. The optical input device of claim 11, wherein the controller is arranged to:

adjust at least one of sensitivity of the image sensor of, driving power of the light source and pulse duration of the light source; and adjust the at least one of sensitivity of the image sensor, driving power of the light source and pulse duration of the light source until the intensity of the captured reflected light is not lower than the desired level by a first threshold or not higher than the desired level by a second threshold.

* * * * *